United States Patent
Sands et al.

(10) Patent No.: US 10,737,801 B2
(45) Date of Patent: Aug. 11, 2020

(54) FAN MODULE WITH ROTATABLE VANE RING POWER SYSTEM

(71) Applicant: Rolls-Royce Corporation, Indianapolis, IN (US)

(72) Inventors: Jonathan S. Sands, Clayton, IN (US); Richard K. Keller, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 669 days.

(21) Appl. No.: 15/339,171

(22) Filed: Oct. 31, 2016

(65) Prior Publication Data

US 2018/0118368 A1    May 3, 2018

(51) Int. Cl.
| | |
|---|---|
| B64D 41/00 | (2006.01) |
| B64D 27/20 | (2006.01) |
| B64D 27/24 | (2006.01) |
| F02C 7/36 | (2006.01) |
| F01D 15/10 | (2006.01) |
| B64D 27/18 | (2006.01) |

(52) U.S. Cl.
CPC ............ B64D 41/00 (2013.01); B64D 27/18 (2013.01); B64D 27/20 (2013.01); B64D 27/24 (2013.01); F01D 15/10 (2013.01); F02C 7/36 (2013.01); *B64D 2221/00* (2013.01); *F05D 2220/34* (2013.01); *F05D 2220/36* (2013.01)

(58) Field of Classification Search
CPC .... B64D 2221/00; B64D 27/18; B64D 27/20; B64D 27/24; B64D 41/00; F01D 15/10; F02C 7/36; F05D 2220/34; F05D 2220/36
See application file for complete search history.

(56) References Cited

U.S. PATENT DOCUMENTS

| | | | |
|---|---|---|---|
| 2,605,849 A | 8/1952 | Bordelon | |
| 2,732,019 A | 1/1956 | Stebbins | |
| 3,161,237 A | 12/1964 | Szydlowski | |
| 4,222,235 A * | 9/1980 | Adamson | F02C 6/003 60/226.1 |
| 4,242,864 A * | 1/1981 | Cornett | F02K 1/17 60/226.1 |

(Continued)

FOREIGN PATENT DOCUMENTS

| | | |
|---|---|---|
| DE | 102013209538 A1 | 11/2014 |
| EP | 1918564 A2 | 5/2008 |

(Continued)

OTHER PUBLICATIONS

Extended EP Search Report completed Mar. 28, 2018 and issued in connection with EP Appln. No. 17196502.3.

(Continued)

*Primary Examiner* — Medhat Badawi
(74) *Attorney, Agent, or Firm* — Barnes & Thornburg LLP

(57) ABSTRACT

A fan module for an aircraft is disclosed herein. The fan module includes a fan rotor, a vane ring, and an optional power supply system. The fan rotor is configured to discharge thrust in an aft direction when rotated about a central axis. The vane ring is located aft of the fan rotor along the central axis and mounted for rotation about the central axis. The vane ring includes a plurality of airfoils arranged to interact with the thrust discharged by the fan rotor so that the thrust drives rotation of the vane ring.

11 Claims, 4 Drawing Sheets

(56) References Cited

U.S. PATENT DOCUMENTS

| | | | | |
|---|---|---|---|---|
| 4,258,545 A * | 3/1981 | Slater | F02C 9/00 | 60/226.1 |
| 4,688,995 A * | 8/1987 | Wright | B64C 11/306 | 416/127 |
| 4,728,261 A * | 3/1988 | Wright | B64C 11/32 | 416/127 |
| 4,734,007 A * | 3/1988 | Perry | F01D 5/3023 | 415/173.1 |
| 4,738,589 A * | 4/1988 | Wright | B64C 11/306 | 416/127 |
| 4,810,164 A * | 3/1989 | Wright | F01D 7/00 | 415/129 |
| 4,936,748 A * | 6/1990 | Adamson | F02C 6/206 | 416/123 |
| 4,968,217 A * | 11/1990 | Newton | B64C 11/32 | 416/147 |
| 4,998,995 A * | 3/1991 | Blythe | B64D 27/06 | 244/53 R |
| 5,090,869 A * | 2/1992 | Wright | B64C 11/306 | 416/127 |
| 5,364,231 A * | 11/1994 | Eick | B64C 11/38 | 416/157 R |
| 5,911,679 A * | 6/1999 | Farrell | F01D 17/162 | 415/149.2 |
| 6,343,768 B1 * | 2/2002 | Muldoon | B64C 29/0033 | 244/56 |
| 6,748,744 B2 * | 6/2004 | Peplow | F02C 9/28 | 60/243 |
| 7,107,756 B2 * | 9/2006 | Rolt | F02K 3/06 | 60/224 |
| 7,406,370 B2 * | 7/2008 | Kojori | G05B 9/03 | 180/65.8 |
| 7,555,893 B2 * | 7/2009 | Okai | B64D 27/24 | 244/1 R |
| 7,584,923 B2 * | 9/2009 | Burrage | B64C 29/0033 | 244/17.23 |
| 7,730,714 B2 * | 6/2010 | Wood | F01D 17/162 | 60/226.1 |
| 7,901,185 B2 * | 3/2011 | Suciu | F01D 5/148 | 416/155 |
| 8,240,124 B2 * | 8/2012 | Colotte | F02C 7/32 | 60/204 |
| 8,322,647 B2 * | 12/2012 | Amraly | B64C 11/001 | 244/12.4 |
| 8,701,381 B2 | 4/2014 | Eames | | |
| 8,978,356 B2 * | 3/2015 | Burgess | F02K 1/06 | 60/226.2 |
| 9,163,583 B2 * | 10/2015 | James | F02K 1/70 | |
| 9,458,844 B2 | 10/2016 | Gieras et al. | | |
| 9,527,588 B1 * | 12/2016 | Rollefstad | B64C 39/024 | |
| 9,561,860 B2 * | 2/2017 | Knapp | B64C 11/001 | |
| 9,637,217 B2 * | 5/2017 | Marrinan | B64C 1/16 | |
| 9,644,537 B2 | 5/2017 | Suciu et al. | | |
| 9,834,305 B2 * | 12/2017 | Taylor | B64C 39/024 | |
| 2006/0174629 A1 * | 8/2006 | Michalko | F02C 9/00 | 60/774 |
| 2008/0121756 A1 * | 5/2008 | McComb | B64C 15/02 | 244/60 |
| 2008/0253881 A1 * | 10/2008 | Richards | F02C 7/052 | 415/145 |
| 2009/0139202 A1 * | 6/2009 | Agrawal | F02C 6/206 | 60/226.3 |
| 2009/0289456 A1 * | 11/2009 | McLoughlin | F01D 15/10 | 290/46 |
| 2009/0289516 A1 * | 11/2009 | Hopewell | F02C 7/32 | 310/115 |
| 2010/0047068 A1 * | 2/2010 | Parry | B64C 11/48 | 416/1 |
| 2010/0124500 A1 * | 5/2010 | Lebrun | B64C 11/18 | 416/128 |
| 2010/0133832 A1 * | 6/2010 | Butt | B64C 11/48 | 290/46 |
| 2010/0155526 A1 * | 6/2010 | Negulescu | B64D 27/08 | 244/55 |
| 2010/0186418 A1 * | 7/2010 | Beutin | F01D 15/10 | 60/802 |
| 2010/0206982 A1 * | 8/2010 | Moore | B64C 11/48 | 244/62 |
| 2010/0251726 A1 * | 10/2010 | Jones | F02C 7/32 | 60/773 |
| 2012/0128487 A1 * | 5/2012 | Eames | B64C 11/346 | 416/1 |
| 2012/0304619 A1 * | 12/2012 | Beachy Head | F01D 7/00 | 60/204 |
| 2013/0019585 A1 * | 1/2013 | Merry | F01D 17/162 | 60/226.3 |
| 2013/0104523 A1 * | 5/2013 | Kupratis | F02K 3/12 | 60/226.1 |
| 2014/0260182 A1 * | 9/2014 | Suciu | F02C 3/10 | 60/224 |
| 2014/0377079 A1 * | 12/2014 | Gieras | F04B 35/04 | 417/15 |
| 2015/0078888 A1 * | 3/2015 | Golshany | F02C 7/36 | 415/123 |
| 2016/0023773 A1 * | 1/2016 | Himmelmann | B64D 27/10 | 60/778 |
| 2016/0069275 A1 * | 3/2016 | Lecordix | F02C 9/22 | 415/1 |
| 2016/0214727 A1 * | 7/2016 | Hamel | B64D 27/18 | |
| 2017/0081037 A1 * | 3/2017 | Marrinan | B64D 29/04 | |
| 2017/0175753 A1 * | 6/2017 | Tan-Kim | F04D 29/054 | |
| 2018/0050796 A1 * | 2/2018 | Wittmaak | B64C 27/12 | |
| 2018/0057150 A1 * | 3/2018 | Cheung | B64C 21/08 | |
| 2018/0118363 A1 * | 5/2018 | Keller | B64C 11/30 | |
| 2018/0118368 A1 * | 5/2018 | Sands | B64D 27/18 | |

FOREIGN PATENT DOCUMENTS

| | | |
|---|---|---|
| EP | 2458160 A2 | 5/2012 |
| EP | 2730501 A2 | 5/2014 |
| EP | 2962885 A1 | 1/2016 |
| GB | 2423509 A | 8/2006 |
| WO | 2006113877 A2 | 10/2006 |

OTHER PUBLICATIONS

Extended EP Search Report dated Mar. 14, 2018 and issued in connection with European Patent Appln. No. 17194560.3.

* cited by examiner

FAN MODULE WITH ROTATABLE VANE RING POWER SYSTEM

FIELD OF THE DISCLOSURE

The present disclosure relates generally to aircraft propulsion systems, and more specifically to fan modules included in aircraft propulsion systems.

BACKGROUND

Aircraft propulsion systems may include gas turbine engines that are used to power the aircraft. Gas turbine engines typically include a compressor, a combustor, and a turbine. The compressor compresses air drawn into the engine and delivers high pressure air to the combustor. In the combustor, fuel is mixed with the high pressure air and the mixture is ignited. Products of the combustion reaction in the combustor are directed into the turbine where work is extracted to drive the compressor and, sometimes, a fan module coupled to the turbine by an output shaft. Left-over products of the combustion reaction are exhausted out of the turbine and may provide thrust in some applications.

Gas turbine engines may be used to power engine accessories and/or aircraft accessories. Depending on flight conditions, gas turbine engines may be required to provide thrust for the aircraft and/or power the accessories. Designing aircraft propulsion systems to satisfy aircraft thrust requirements while providing adequate power for accessories during various flight conditions remains an area of interest.

SUMMARY

The present disclosure may comprise one or more of the following features and combinations thereof.

According to one aspect of the present disclosure, a fan module may include a fan rotor, a vane ring, and a power supply system. The fan rotor may be configured to discharge thrust in an aft direction when rotated about a central axis. The vane ring may be located aft of the fan rotor along the central axis and mounted for rotation about the central axis. The vane ring may include a plurality of airfoils arranged to interact with the thrust discharged by the fan rotor so that the thrust drives rotation of the vane ring. The power supply system may include a generator selectively coupled to the vane ring to produce electrical power in response to rotation of the vane ring, a brake coupled to the vane ring to selectively block rotation of the vane ring about the central axis, and a controller coupled to the generator and the brake. The controller may be configured to engage the brake to block rotation of the vane ring in a thrust mode of the fan module associated with relatively high-thrust conditions so that electrical power is not produced by the generator and to disengage the brake to permit rotation of the vane ring in a power mode of the fan module associated with relatively low-thrust conditions so that electrical power is produced by the generator.

In some embodiments, the plurality of airfoils of the vane ring may provide a plurality of fan exit guide vanes arranged directly aft of the fan rotor that are constrained against rotation about the central axis during operation of the fan module in the thrust mode. The plurality of fan exit guide vanes may be configured for rotation about the central axis during operation of the fan module in the power mode. Additionally, in some embodiments, rotation of the fan rotor about the central axis may be driven by operation of at least one of two gas turbine engines.

In some embodiments, the power supply system may include a torque transmitting device coupled between the vane ring and the generator, and the controller may be configured to control operation of the torque transmitting device to selectively transmit rotation from the vane ring to the generator. The controller may be configured to at least partially engage the torque transmitting device to transmit rotation from the vane ring to the generator so that the generator produces electrical power in response to rotation of the vane ring about the central axis during operation of the fan module in the power mode. The controller may be configured to disengage the torque transmitting device to de-couple the vane ring from the generator during operation of the fan module in the thrust mode. The controller may be configured to monitor a load experienced by the generator during operation of the fan module in the power mode and to adjust engagement of the torque transmitting device based on the monitored load.

According to another aspect of the present disclosure, a fan module may include a fan rotor, a vane ring, and a power supply system. The fan rotor may be configured for rotation about a central axis. The vane ring may be mounted for rotation about the central axis. The power supply system may include a generator coupled to the vane ring and configured to produce electrical power in response to rotation of the vane ring and a brake coupled to the vane ring and configured to block or permit rotation of the vane ring.

In some embodiments, the power supply system may include a controller coupled to the generator and the brake, and the controller may be configured to engage the brake to block rotation of the vane ring about the central axis so that the vane ring does not drive the generator to produce electrical power and to disengage the brake to permit rotation of the vane ring about the central axis so that the vane ring drives the generator to produce electrical power. The controller may be configured to engage the brake during operation of the fan module in a thrust mode in which pressurized air discharged by the fan rotor is generally directed along the central axis by the vane ring to produce thrust and to disengage the brake during operation of the fan module in a power mode in which pressurized air discharged by the fan rotor is not generally directed along the central axis by the vane ring to produce thrust. The power supply system may include a torque transmitting device coupled between the vane ring and the generator, and the controller may be configured to control operation of the torque transmitting device to transmit rotation from the vane ring to the generator during operation of the fan module in the power mode. The controller may be configured to at least partially engage the torque transmitting device to transmit rotation from the vane ring to the generator so that the generator produces electrical power during operation of the fan module in the power mode. The controller may be configured to monitor a load experienced by the generator during operation of the fan module in the power mode and to adjust engagement of the torque transmitting device based on the monitored load. Additionally, in some embodiments, rotation of the fan rotor about the central axis may be driven by operation of two gas turbine engines.

According to yet another aspect of the present disclosure, an aircraft may include an airframe, a plurality of gas turbine engines supported by the airframe, and a fan module supported by the airframe. The fan module may include a fan rotor, a vane ring, and a power supply system. The fan rotor may be coupled to the plurality of gas turbine engines and configured for rotation about a central axis. The vane ring may be mounted for rotation about the central axis in response to rotation of the fan rotor about the central axis. The power supply system may have a generator selectively coupled to the vane ring, a brake coupled to the vane ring, and a controller coupled to the generator and the brake. The controller may be configured to engage the brake to block rotation of the vane ring about the central axis so that the vane ring does not drive the generator to produce electrical power and to disengage the brake to permit rotation of the vane ring about the central axis so that the vane ring drives the generator to produce electrical power.

In some embodiments, the airframe may include a nose end and a tail end located aft of the nose end along the central axis, the plurality of gas turbine engines may be located closer to the nose end of the airframe than the tail end of the airframe, and the fan module may be located closer to the tail end of the airframe than the nose end of the airframe. The controller may be configured to engage the brake during operation of the aircraft in a thrust mode in which pressurized air discharged by the fan rotor is generally directed along the central axis by the vane ring to produce thrust and to disengage the brake during operation of the aircraft in a power mode in which pressurized air discharged by the fan rotor is not generally directed along the central axis by the vane ring to produce thrust.

In some embodiments, the power supply system may include a torque transmitting device coupled between the vane ring and the generator, and the controller may be configured to control operation of the torque transmitting device to selectively transmit rotation from the vane ring to the generator. The controller may be configured to monitor a load experienced by the generator during operation of the aircraft and to adjust engagement of the torque transmitting device based on the monitored load when torque is transmitted from the vane ring to the generator to drive the generator to produce electrical power These and other features of the present disclosure will become more apparent from the following description of the illustrative embodiments.

DETAILED DESCRIPTION

Figure 1:
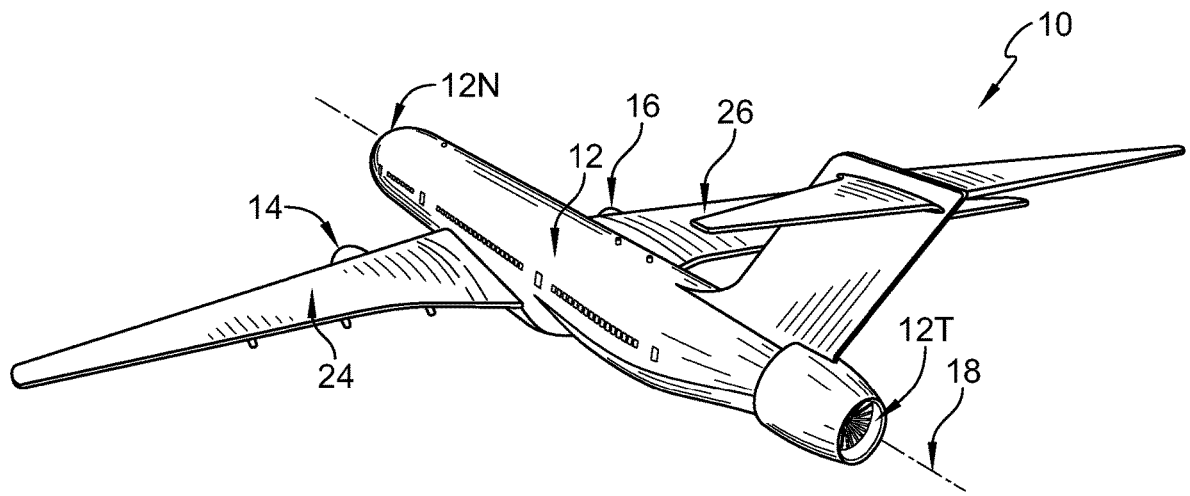
FIG. 1 is a perspective view of an aircraft showing that the aircraft includes an airframe, a pair of gas turbine engines supported by the airframe, and a fan module supported by the airframe.

For the purposes of promoting an understanding of the principles of the disclosure, reference will now be made to a number of illustrative embodiments illustrated in the drawings and specific language will be used to describe the same.

Figure 2:
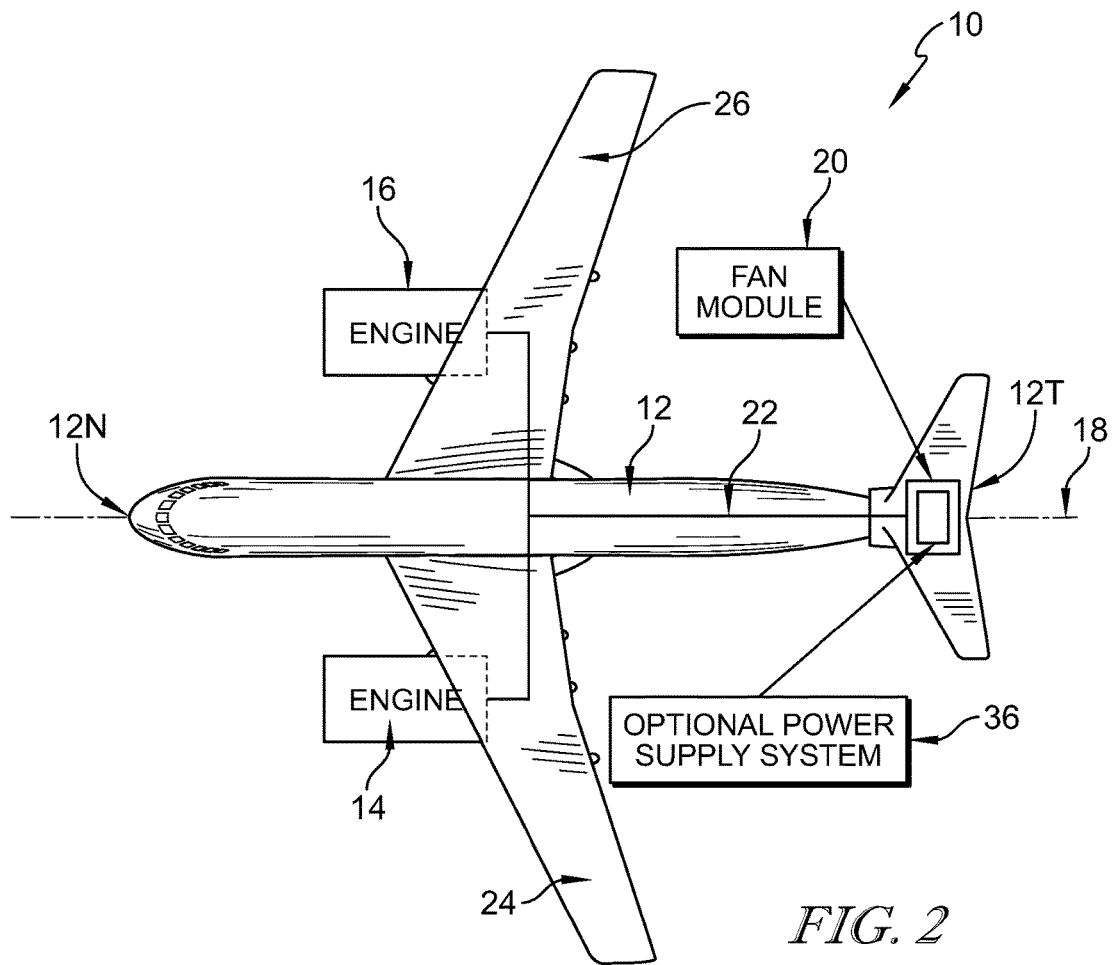
FIG. 2 is a top view of the aircraft of FIG. 1 showing that the gas turbine engines are coupled to the fan module to drive the fan module and showing that the fan module includes an optional power supply system.

Referring now to FIGS. 1 and 2, an illustrative aircraft 10 includes an airframe 12 and a pair of gas turbine engines 14, 16 supported by the airframe 12. The airframe 12 has a nose end 12N and a tail end 12T located aft of the nose end 12N along a central axis 18. The gas turbine engines 14, 16 are substantially identical to one another and configured to drive a fan module 20 included in the aircraft 10 via at least one output shaft 22 that couples the engines 14, 16 to the fan module 20.

In the illustrative embodiment, the aircraft 10 includes only two gas turbine engines 14, 16 distributed along respective wings 24, 26 thereof as shown in FIGS. 1 and 2. The gas turbine engines 14, 16 are located closer to the nose end 12N of the airframe 12 than the tail end 12T of the airframe 12. The fan module 20 is located closer to the tail end 12T than the nose end 12N.

Figure 6:
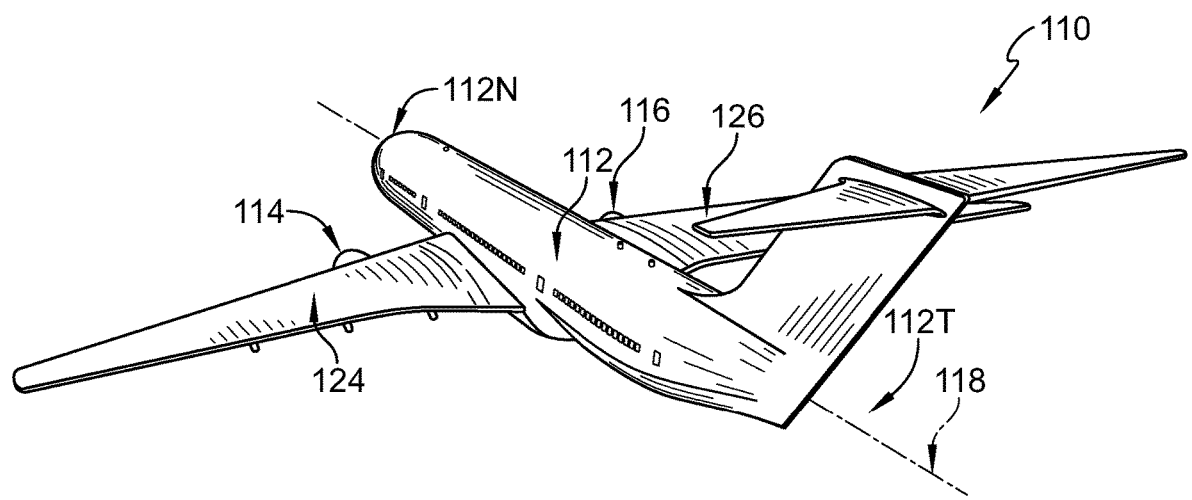
FIG. 6 is a perspective view of another aircraft showing that the aircraft includes an airframe, a pair of gas turbine engines supported by the airframe, and a pair of fan modules supported by the airframe.
Figure 7:
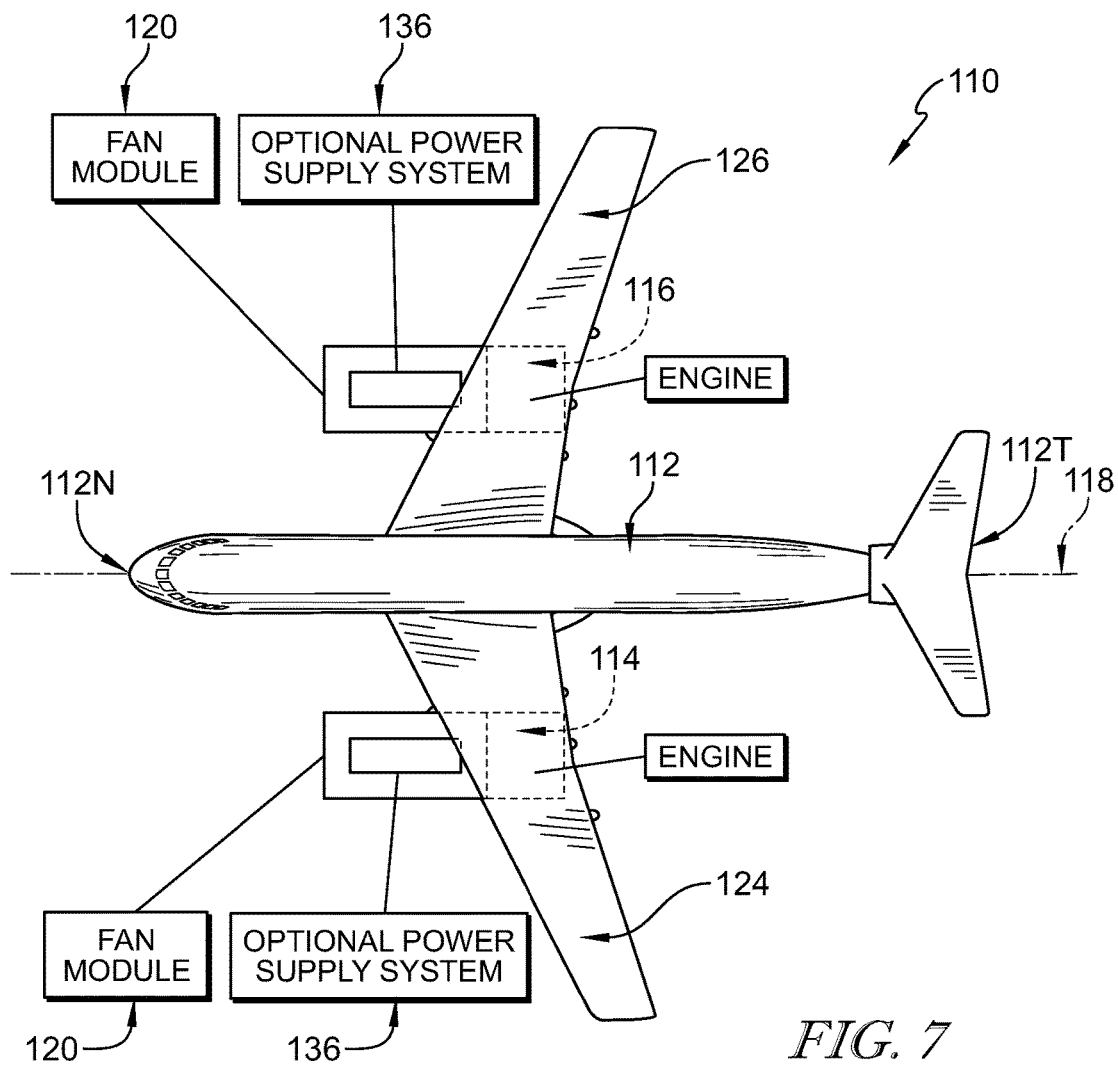
FIG. 7 is a top view of the aircraft of FIG. 6 showing that each of the gas turbine engines is coupled to one of the fan modules to drive the fan module and showing that each fan module includes an optional power supply system.

In other embodiments, the aircraft 10 may include another suitable number of gas turbine engines distributed along the wings 24, 26 to provide one or more distributed propulsion systems. Additionally, in other embodiments, the gas turbine engines 14, 16 and the fan module 20 may be arranged relative to one another in another suitable arrangement. For example, in some embodiments, the fan module 20 may be arranged forward of the engines 14, 16 along the central axis 18 in similar fashion to the arrangement of the fan modules 120 relative to the engines 114, 116 along the central axis 118 as shown in FIGS. 6 and 7.

Figure 3:
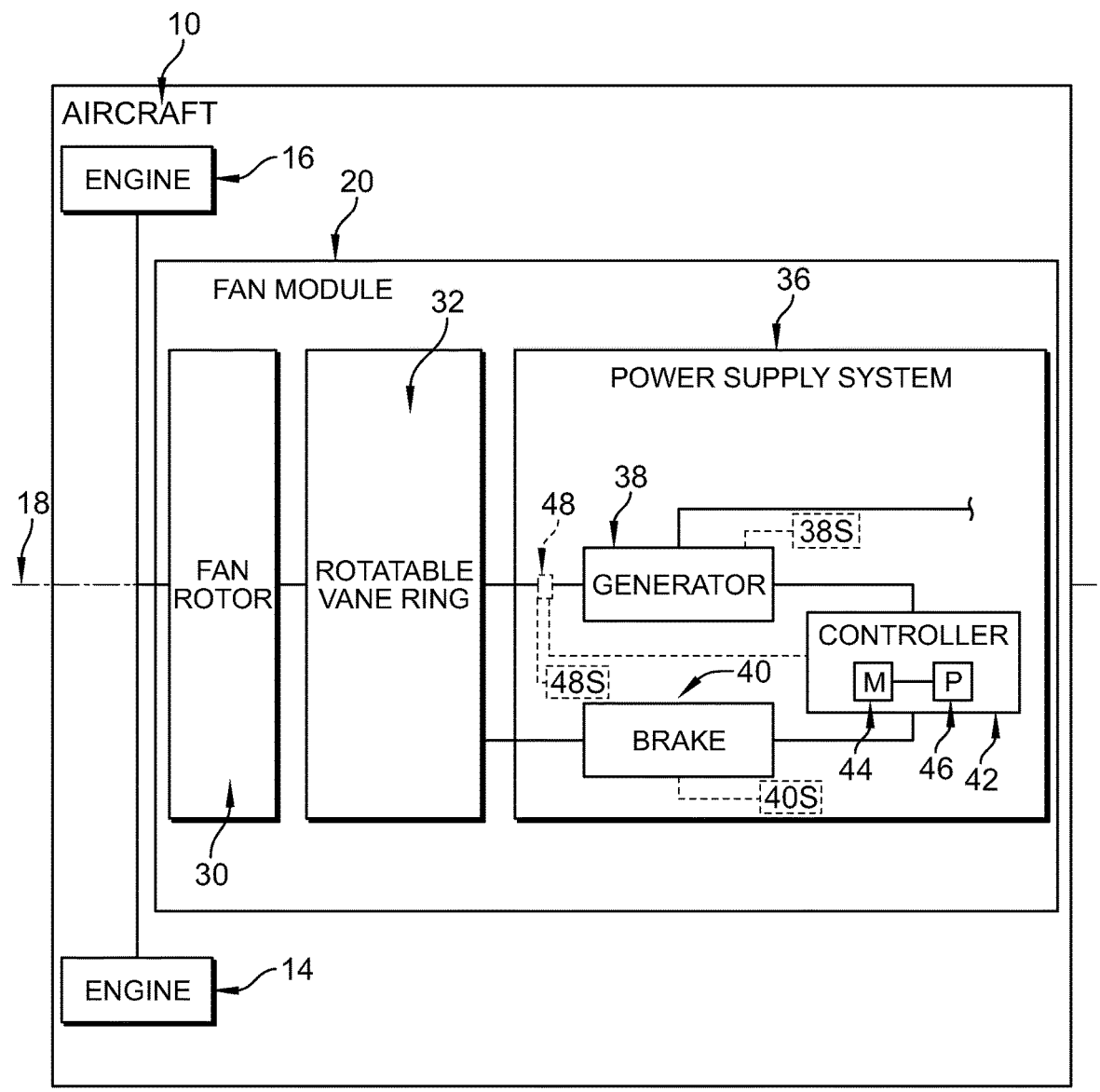
FIG. 3 is a diagrammatic view of the aircraft of FIG. 2 showing that the fan module includes a fan rotor coupled to the gas turbine engines and a vane ring mounted for rotation about a central axis in response to rotation of the fan rotor about the central axis, and showing that the power supply system includes a generator coupled to the vane ring, a brake coupled to the vane ring, and a controller coupled to the generator and the brake.

Referring now to FIG. 3, the illustrative fan module 20 includes a fan rotor 30 and a vane ring 32 located aft of the fan rotor 30 along the central axis 18. The fan rotor 30 is configured to discharge thrust aftward along the axis 18 when driven to rotate about the axis 18 by at least one of the gas turbine engines 14, 16. The vane ring 32 is mounted for rotation about the central axis 18 and includes airfoils 34 arranged to interact with the thrust discharged by the fan rotor 30 so that the thrust drives rotation of the vane ring 32.

The illustrative fan module 20 also includes an optional power supply system 36 as shown in FIGS. 2 and 3. The power supply system 36 has a generator 38, a brake 40, and a controller 42. The generator 38 is coupled to the vane ring 32 to produce electrical power in response to rotation of the vane ring 32 about the central axis 18. The brake 40 is coupled to the vane ring 32 to selectively block rotation of the vane ring 32 about the central axis 18. The controller 42 is coupled to the generator 38 and the brake 40 and configured to engage the brake 40 in a thrust mode 20T of the fan module 20 and disengage the brake 40 in a power mode 20P of the fan module 20.

Figure 4:
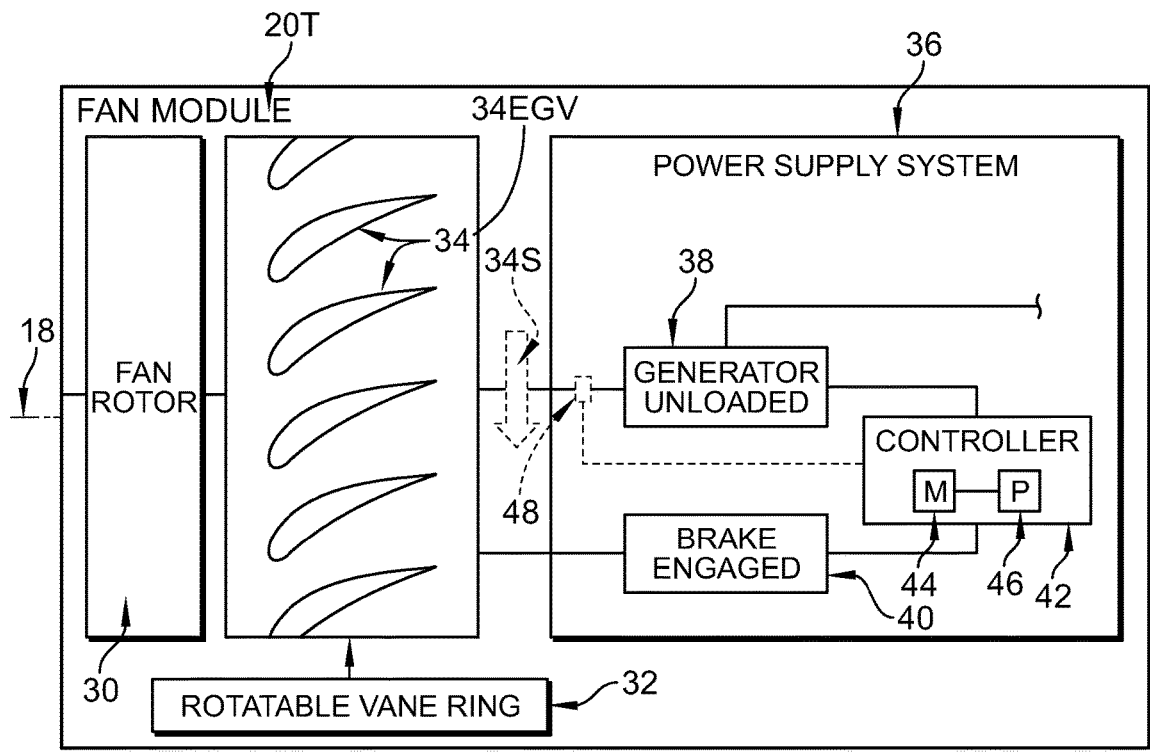
FIG. 4 is a partially diagrammatic view of the fan module depicted in FIG. 3 showing that the fan module is operable in a thrust mode in which the controller engages the brake to block rotation of the vane ring so that electrical power is not produced by the generator.

The thrust mode 20T of the fan module 20 is illustratively associated with relatively-high thrust conditions in which pressurized air discharged by the fan rotor 30 is generally directed along the central axis 18 by the vane ring 32 to produce thrust. The controller 42 engages the brake 40 during operation of the module 20 in the thrust mode 20T to block rotation of the vane ring 32 as shown in FIG. 4. Because engagement of the brake 40 prevents the vane ring 32 from rotating and thereby driving the generator 38 to produce electrical power, electrical power is not supplied by the generator 38 to accessories of the engines 14,16 and/or the aircraft 10 in the thrust mode 20T.

Figure 5:
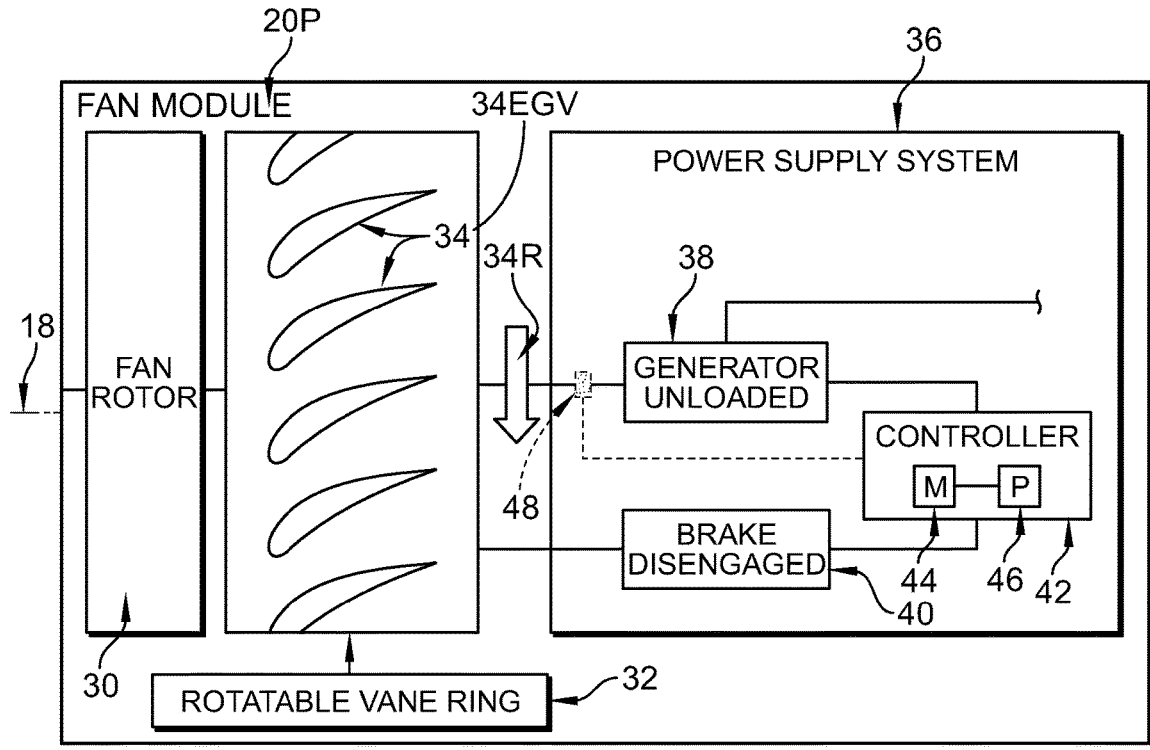
FIG. 5 is a partially diagrammatic view of the fan module depicted in FIG. 3 showing that the fan module is operable in a power mode in which the controller disengages the brake to permit rotation of the vane ring so that air from the fan rotor causes rotation of the vane ring and electrical power is produced by the generator.

The power mode 20P of the fan module 20 is illustratively associated with relatively-low thrust conditions in which pressurized air discharged by the fan rotor 30 is not generally directed along the central axis 18 by the vane ring 32 to produce thrust. The controller 42 disengages the brake 40 during operation of the module 20 in the power mode 20P to permit rotation of the vane ring 32 as shown in FIG. 5. Because disengagement of the brake 40 allows the vane ring 32 to rotate and thereby drive the generator 38 to produce electrical power, electrical power is supplied by the generator 38 to accessories of the engines 14, 16 and/or the aircraft 10 in the power mode 20P. As such, the vane ring 32 may be said to act as a ram air turbine (RAT) during operation of the fan module 20 in the power mode 20P.

In the illustrative embodiment, the airfoils 34 of the vane ring 32 provide fan exit guide vanes 34EGV arranged directly aft of the fan rotor 30 along the central axis 18 as shown in FIGS. 4 and 5. The guide vanes 34EGV are constrained against rotation about the axis 18 when the brake 40 is engaged in the thrust mode 20T of the fan module 20 as indicated by arrow 34S. The guide vanes 34EGV are configured for rotation about the axis 18 when the brake 40 is disengaged in the power mode 20P of the module 20 as indicated by arrow 34R.

In the illustrative embodiment, the generator 38 is embodied as, or otherwise includes, a device configured to convert mechanical energy (i.e., rotational power) into electrical power as shown in FIG. 5. The generator 38 is embodied as, or otherwise includes, a device configured to convert rotational power provided by the vane ring 32 into electrical power for use by direct current (DC) and/or alternating current (AC) accessories of the engines 14, 16 and/or the aircraft 10.

In the illustrative embodiment, the brake 40 is embodied as, or otherwise includes, a device configured to constrain the guide vanes 34EGV against rotation about the central axis 18 when the device is engaged as shown in FIG. 4. In some embodiments, the brake 40 may be embodied as, or otherwise include, a frictional brake such as a band brake, a drum brake, a disc brake, a or the like. In other embodiments, the brake 40 may be embodied as, or otherwise include, a pumping brake or an electromagnetic brake.

In the illustrative embodiment, the controller 42 is embodied as, or otherwise includes, a device configured to control operation of the power supply system 36 (i.e., the generator 38, the brake 40, and any other components included therein). The controller 42 includes memory 44 and a processor 46 coupled to the memory 44 as shown in FIG. 3. The memory 44 includes instructions that, when executed by the processor 46, cause the processor 46 to perform various actions to control the components of the system 36.

In some embodiments, the power supply system 36 may include an optional torque transmitting device 48 coupled between the vane ring 32 and the generator 38 as shown in FIG. 3. The torque transmitting device 48 may be embodied as, or otherwise include, a device configured to selectively transmit rotation from the vane ring 32 to the generator 38 during operation of the fan module 20. For instance, the torque transmitting device 48 may be embodied as, or otherwise include, a friction clutch, a hydrodynamic clutch, an electromagnetic clutch, a magnetic particle clutch, or the like. The torque transmitting device 48 may be coupled to the controller 42 and the controller 42 may be configured to control operation of the device 48.

In other embodiments, the torque transmitting device 48 may be omitted from the power supply system 36. In such embodiments, rather than being coupled indirectly to the generator 38 through the device 48 as shown in FIGS. 3-5, the vane ring 32 would be directly coupled to the generator 38.

In some embodiments, the power supply system 36 may include one or more devices configured to monitor the operation of the generator 38, the brake 40, the torque transmitting device 48, and any other components of the system 36. In one example, the power supply system 36 may include a sensor 38S coupled to the generator 38 and configured to monitor one or more operational parameters of the generator 38 as shown in FIG. 3. For instance, the sensor 38S may be configured to monitor the load experienced by the generator 38 during operation of the fan module 20.

In another example, the power supply system 36 may include a sensor 40S coupled to the brake 40 and configured to monitor one or more operational parameters of the brake 40 as shown in FIG. 3. For instance, the sensor 40S may be configured to monitor the engagement state of the brake 40. In yet another example, the power supply system 36 may include a sensor 48S coupled to the torque transmitting device 48 and configured to monitor one or more operational parameters of the device 48 as shown in FIG. 3. For instance, the sensor 48S may be configured to monitor the engagement state of the torque transmitting device 48.

In some embodiments, the illustrative power supply system 36 may be adapted for use in an electric propulsion system, such as a distributed electric propulsion system. In such embodiments, the electric propulsion system may be operated in some situations to drive a load and in other situations to provide a generator that produces electrical power that may be supplied to accessories of the propulsion system and/or the vehicle carrying the propulsion system.

In some embodiments, the aircraft 10 may include more than one fan module 20 driven by at least one of the gas turbine engines 14, 16. In such embodiments, one fan module 20 may be driven by at least one of the engines 14, 16 while another fan module 20 may be de-coupled from the engines 14, 16 so that the another fan module 20 is not driven by at least one of the engines 14, 16. The one fan module 20 may be driven by at least one of the engines 14, 16 to produce thrust, whereas the another fan module 20 may be driven in response to ram air interaction to produce electrical power.

Referring now to FIGS. 4 and 5, operation of the fan module 20 will be described in detail. Specifically, operation of the fan module 20 in the thrust mode 20T is described below with reference to FIG. 4 and operation of the module 20 in the power mode 20P is described below with reference to FIG. 5.

During operation of the fan module 20 in the thrust mode 20T, the controller 42 controls the power supply system 36 to prevent production of electrical power by the generator 38 as shown in FIG. 4. The instructions stored in the memory 44 are executed by the processor 46 to cause the processor 46 to engage the brake 40 to constrain the vane ring 32 against rotation about the central axis 18 in the mode 20T. Because the vane ring 32 is constrained against rotation, no rotation can be transmitted from the vane ring 32 to the generator 38 to drive the generator 38 to produce electrical power. The instructions stored in the memory 44 also may be executed by the processor 46 to cause the processor 46 to disengage the torque transmitting device 48 to de-couple the vane ring 32 from the generator in the mode 20T. Because the vane ring 32 is de-coupled from the generator 38, the vane ring 32 is unable to drive the generator 38 to produce electrical power in the mode 20T.

During operation of the fan module 20 in the power mode 20P, the controller 42 controls the power supply system 36 to allow production of electrical power by the generator 38 as shown in FIG. 5. The instructions stored in the memory 44 are executed by the processor 46 to cause the processor 46 to disengage the brake 40 to allow the vane ring 32 to rotate about the central axis 18 in the mode 20P. The instructions stored in the memory 44 also may be executed by the processor 46 to cause the processor 46 to at least partially engage the torque transmitting device 48 to couple the vane ring 32 to the generator 38 in the mode 20P. Because the vane ring 32 is driven to rotate about the axis 18, and because the vane ring 32 is coupled to the generator 38, the generator 38 produces electrical power in the mode 20P.

During operation of the fan module 20 in the power mode 20P, the controller 42 may control the power supply system 36 to adjust engagement of the torque transmitting device 48 as suggested by FIG. 5. The instructions stored in the memory 44 may be executed by the processor 46 to cause the processor 46 to monitor the load experienced by the generator 38 in the mode 20P. The instructions stored in the memory 44 also may be executed by the processor 46 to cause the processor 46 to adjust engagement of the torque transmitting device 48 based on the monitored load of the generator 38 in the mode 20P. For example, the instructions stored in the memory 44 may be executed by the processor 46 to cause the processor 46 to adjust engagement of the device 48 so that the monitored load of the generator 38 does not exceed a maximum load thereof.

Future configurations of turbofan-powered air vehicles (e.g., the aircraft 10) may have greater power offtake requirements (e.g., power supplied to the accessories by the generator 38) than in current configurations. Increasing power offtake requirements may increase the demand placed upon propulsion systems (e.g., the gas turbine engines 14, 16 and the fan module 20) such that compromises in mission systems and/or mission performance capabilities may be required to provide adequate thrust and power offtake. Such compromises may be necessary at high altitude flight conditions where achieving engine power offtake requirements may be more demanding of propulsion systems than achieving thrust requirements at altitude. In some situations, operators may be required to choose between flying at high altitude conditions and shutting down electronic systems or flying at altitude and powering electronic systems.

Oversizing a turbofan propulsion system to provide adequate thrust and power offtake may be undesirable in some situations. The present disclosure may provide a design of a turbofan propulsion system that avoids the drawbacks associated with such oversizing while satisfying thrust and power offtake requirements.

The present design may involve modification to the fan exit guide vanes (EGVs). Traditional fan EGVs may be stationary and used substantially to redirect flow along the axial direction (e.g., along the central axis 18) to maximize thrust. The present design may allow the fan EGVs (e.g., the fan exit guide vanes 34EGV) to rotate to power an electric generator (e.g., the generator 38).

During normal operation (e.g., the thrust mode 20T shown in FIG. 4), a brake (e.g., the brake 40) may be engaged to keep the fan EGVs stationary, thereby allowing the EGVs to augment flow and produce thrust as traditionally used. When thrust is not needed (e.g., during the power mode 20P shown in FIG. 5), the brake may be disengaged to allow the EGVs to absorb energy from the flow in order to power the generator. As a result, the fan EGVs may be used as a ram air turbine (RAT) when thrust is not needed.

Augmentation of inlet and/or exhaust areas may be used to minimize possible negative impacts on performance. In particular, inlet/exhaust area modification may be used to minimize ram drag, spillage drag, and boat tail drag.

The present design may be used in a wide range of air vehicle applications including single and multi-engine applications as well as both distributed mechanical and electrical applications. Use of the present design in a distributed electric propulsion system application may allow the propulsion system to be used in regenerative cycles, in similar fashion to regenerative braking of hybrid vehicles. In some applications, use of the present design may allow one or more fans to be disconnected from the gas turbine engine(s) driving the fans, thereby allowing the engine(s) to throttle back and the fans to act as turbines in order to charge power cells or power electronic systems. Use of the present design in a distributed mechanical propulsion system application may involve one or more fans being clutched, thereby allowing one or more fans to be operated in RAT mode to extract power from the flow instead of producing thrust.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan module comprising
a fan rotor arranged within a ducted turbofan gas turbine engine, the fan module configured to discharge slipstream in an aft direction when rotated about a central axis,
a vane ring located aft of the fan rotor within the ducted turbofan gas turbine engine along the central axis and mounted for rotation about the central axis, the vane ring including a plurality of fan exit guide vanes arranged to interact with the slipstream discharged by the fan rotor so that the slipstream drives rotation of the vane ring, and
a power supply system including a generator selectively coupled to the vane ring to produce electrical power in response to rotation of the vane ring, a brake coupled to the vane ring to selectively block rotation of the vane ring about the central axis, a controller coupled to the generator and the brake, and a torque transmitting device coupled between the vane ring and the generator,
wherein the controller is configured to engage the brake to block rotation of the vane ring in a thrust mode of the fan module and disengage the torque transmitting device from the generator so that electrical power is not produced by the generator and to disengage the brake to permit rotation of the vane ring in a power mode of the fan module and engage the torque transmitting device with the generator so that electrical power is produced by the generator in response to rotation of the vane ring about the central axis by the slipstream produced by the fan rotor.

2. The fan module of claim 1, wherein the plurality of fan exit guide vanes of the vane ring are arranged directly aft of the fan rotor are constrained against rotation about the central axis during operation of the fan module in the thrust mode.

3. The fan module of claim 2, wherein the plurality of fan exit guide vanes are configured for rotation about the central axis during operation of the fan module in the power mode.

4. The fan module of claim 1, wherein the controller is configured to monitor a load experienced by the generator during operation of the fan module in the power mode and to adjust engagement of the torque transmitting device based on the monitored load.

5. The fan module of claim 1, wherein rotation of the fan rotor about the central axis is driven by operation of at least one of two gas turbine engines.

6. An aircraft comprising
an airframe,
a plurality of ducted turbofan gas turbine engines supported by the airframe, and
a fan module of one of the turbofan gas turbine engines, the fan module having
a fan rotor coupled to the plurality of gas turbine engines and configured for rotation about a central axis,
a vane ring mounted for rotation about the central axis in response to rotation of the fan rotor about the central axis, and
a power supply system having a generator selectively coupled to the vane ring, a brake coupled to the vane ring, a controller coupled to the generator and the brake, and a torque transmitting device coupled between the vane ring and the generator,
wherein the controller is configured to engage the brake to block rotation of the vane ring in a thrust mode of the fan module and disengage the torque transmitting device from the generator so that electrical power is not produced by the generator and to disengage the brake to permit rotation of the vane ring in a power mode of the fan module and engage the torque transmitting device with the generator so that electrical power is produced by the generator in response to rotation of the vane ring about the central axis by slipstream produced by the fan rotor, and
wherein the controller is configured to monitor a load experienced by the generator during operation of the aircraft and to block or engage the torque transmitting device based on the monitored load.

7. The aircraft of claim 6, wherein the airframe includes a nose end and a tail end located aft of the nose end relative to the central axis, the plurality of gas turbine engines are located closer to the nose end of the airframe than the tail end of the airframe, and the fan module is located closer to the tail end of the airframe than the nose end of the airframe.

8. The fan module of claim 1, wherein the controller includes a memory and a processor coupled to the memory and storing instructions that, when executed by the processor, cause the processor to change the fan module from the thrust mode to the power mode.

9. The fan module of claim 8, wherein the instructions stored in the memory are executed by the processor to cause the processor to engage the brake to constrain the vane ring against rotation about the central axis and to cause the processor to disengage the torque transmitting device to de-couple the vane ring from the generator in the thrust mode.

10. The fan module of claim 9, wherein the instructions stored in the memory and executed by the processor cause the processor to adjust engagement of the torque transmitting device based on the monitored load of the generator in the power mode so that the monitored load of the generator does not exceed a maximum predetermined load.

11. The fan module of claim 1, wherein the controller is configured to monitor a load experienced by the generator and to block or engage the torque transmitting device based on the monitored load.

* * * * *